United States Patent [19]
Albrecht et al.

[11] Patent Number: 5,950,011
[45] Date of Patent: Sep. 7, 1999

[54] SYSTEM USING DESIGNER EDITOR AND KNOWLEDGE BASE FOR CONFIGURING PRECONFIGURED SOFTWARE IN AN OPEN SYSTEM IN A DISTRIBUTED ENVIRONMENT

[75] Inventors: Alain Albrecht, Saint Martin D'Heres; Marc Fleurisson, Lans En Vercors; Pierre-Yves Gibello, Grenoble; Bruno Richoux, Uriage; Bruno Sehabiague, St Nizier du Moucherotte, all of France

[73] Assignee: Bull S.A., Louveciennes, France

[21] Appl. No.: 08/806,755

[22] Filed: Mar. 3, 1997

[30] Foreign Application Priority Data

Mar. 1, 1996 [FR] France ................................ 96 02641

[51] Int. Cl.$^6$ .................................................. G06F 13/00
[52] U.S. Cl. ................................ 395/712; 713/1; 713/100
[58] Field of Search ................................ 395/712, 700; 713/1, 100

[56] References Cited

U.S. PATENT DOCUMENTS

| | | | |
|---|---|---|---|
| 4,403,303 | 9/1983 | Howes et al. | 395/500 |
| 4,951,192 | 8/1990 | Chase, Jr. et al. | 395/706 |
| 5,414,812 | 5/1995 | Filip et al. | 707/103 |
| 5,742,829 | 4/1998 | Davis et al. | 395/712 |
| 5,784,612 | 7/1998 | Crane et al. | 395/653 |

FOREIGN PATENT DOCUMENTS

| | | |
|---|---|---|
| 0398644 | 11/1990 | European Pat. Off. . |
| 0509945 | 10/1992 | European Pat. Off. . |
| 9514969 | 1/1995 | WIPO . |

OTHER PUBLICATIONS

IBM Technical Disclosure Bulle, vol. 34, No. 1, Jun. 1, 1991, pp. 430–434, XP00210264 "Graphic APPC Configuration Interface" entire document.

*Primary Examiner*—Le Hien Luu
*Attorney, Agent, or Firm*—Kerkam, Stowell, Kondracki & Clarke, P.C.; Edward J. Kondracki

[57] ABSTRACT

A system for configuring preconfigured software in networked open systems in a distributed environment, including, in a work station, a design device called a designer (DC), an editor (CE) and a knowledge base (KB), and, in a station to be configured, an interpreter (CI). The designer allows read and write access to the knowledge base which contains the data describing the various elements in the network that can be configured and the links between these various elements, said designer making it possible to define the various configuration capabilities of the editor on which the desired configuration is displayed. The editor uses the information in the knowledge base related to the topology of the network and the configuration parameters of the various elements which comprise the network to construct a configurable homogeneous entity which can be loaded into a station to be configured in which the interpreter executes the configuration operations, transforming the initial configuration parameters into parameters specific to the desired configuration which can also be used by the editor. The system implements a specific process for configuring preconfigured software.

10 Claims, 1 Drawing Sheet

SYSTEM USING DESIGNER EDITOR AND KNOWLEDGE BASE FOR CONFIGURING PRECONFIGURED SOFTWARE IN AN OPEN SYSTEM IN A DISTRIBUTED ENVIRONMENT

BACKGROUND OF THE INVENTION

The present invention relates to a system for configuring software in networked open systems in a distributed environment. It also relates to a process implemented by this system.

Generally in data processing, especially in the complex networks of distributed systems, it has proven indispensable to arrange and organize packages of services which are simple to use, user-friendly and efficient, and in particular to offer services for configuring software in the platforms of this distributed environment which are powerful but flexible and quickly implemented. An environment of this type is in fact, widely used at present, and it is known that the use of open, distributed data processing offers enormous advantages since it allows a client, that is the user of an interface, easy access to the various data contained in such systems or machines no matter what the geographical location of this user and regardless of the system in which the data resides. However, while it is desirable for the user to benefit from these advantages during the operating phase, it is also desirable to facilitate the configuration and installation phases, for all kinds of deployments. The term configuration is understood to mean the manipulation of the parameters of a machine, such as the address, the name of the user, the size of the buffer registers, the data related to the software configuration parameters, etc.

Up to now, tools such as SMIT (System Management Interface Tool) or DSMIT (Distributed System Management Interface Tool) were used to configure software in UNIX (registered trademark in the U.S. and other countries, licensed exclusively through X/OPEN Company Limited) platforms which support the AIX (IBM Corp. trademark) operating system. However, with use, it became evident that these tools had major drawbacks. In effect, while the SMIT tool makes it possible to work during the installation, configuration and operating phases, its utilization is nevertheless limited to local systems such as a server, and hence to just one machine, since it was not designed to accommodate either the network aspect or the distributed aspect, which renders it completely ineffective for applications related to networked systems in a distributed environment. As for the DSMIT tool, it has the same characteristics as the SMIT tool except for the fact that it can accommodate the distributed aspect, but it is ineffective in dealing with the network aspect. Thus, with the DSMIT tool, it is possible, for example, to configure several machines at the same time but only with the same address, which, it must be admitted, is very rarely the case in a network.

Another solution can also be used to configure communication software in platforms, which consists of applying a method for distributing software, commonly called "software distribution" by one skilled in the art. A method of this type is generally used by administrators of centrally managed or administrated systems to distribute software to the various administrated platforms. In this case, it is possible to perform an installation, and at the end of this installation to emit a piece of information (which is called a "script" by one skilled in the art, and which is actually a small customization program) containing configuration instructions. However, in order to allow such a configuration, this information, which is not created or constructed automatically, must first be described and entered by a user, which is certainly lacking in simplicity and user-friendliness. Moreover, the syntax of these scripts must conform to strict, constraining rules, particularly in order to support the reentry feature. Reentry, in effect, involves the concept of intelligence, since in order to support it the script must know how to distinguish between an initial activation and a subsequent activation, with the understanding that the result must remain constant, while the action depends on the initial state of the environment upon activation of the script.

SUMMARY OF THE INVENTION

The object of the present invention is to eliminate the various drawbacks of the different known systems or tools and methods of the prior art, and to provide a system for configuring software in open systems which is user-friendly and provides a global, efficient, automatic, and thus easy-to-use solution to the problems which arise in the configuration of networked systems in a distributed environment.

For this purpose, the software configuration system of the present invention is constituted, on one end, in a work station, by a design device called a designer, an editor and a knowledge base, and on the other end, in a station to be configured, by an interpreter. The designer allows read and write access to the knowledge base which contains the data describing the various elements of the network that can be configured and the links between these various elements, which designer makes it possible to define the various configuration capabilities of the editor on which the desired configuration is displayed. The editor uses the information in the knowledge base related to the topology of the network and the configuration parameters of the various elements which compose the network to construct a configurable homogeneous entity which can be loaded, using loading means, into the station to be configured. The interpreter executes the configuration operations, transforming the initial configuration parameters into parameters specific to the desired configuration which can also be used by the editor. The system implements a process for configuring preconfigured software.

Preferably, the system for configuring preconfigured software provides a designer which uses a graphical user interface of the "Windows" type which makes it possible to define new classes of platforms and new classes of system components in order to extend the information in the knowledge base used by the editor, and which for this purpose offers the capability to define, modify or delete platform classes, as well as to define, modify, or delete system component classes and the pages of information associated with these classes, and finally, with respect to the component classes, to define, modify or delete information in the platform classes related to the desired configuration.

The instant system for configuring preconfigured software includes an editor which uses a graphical user interface of the "Windows" type which, first, supplies the user with graphical means for constructing on the screen a topology of the network which represents all of the heterogeneous systems and their interconnections, wherein for each system represented a page or a set of pages of configuration information is filled in, which also provides mechanisms for saving, opening and restoring the configurations defined by the user as well as mechanisms for controlling the uniqueness of an object in the network represented. Moreover, for a configuration specified by the user, the system generates a set of configuration files in a predetermined format, which files are used to generate a piece of configuration information that is executed in the desired configured platform and which finally, from a set of configuration files imported from a configured platform, extracts the actual configuration desired for this platform.

In addition, in the instant system for configuring preconfigured software is remarkable, the interpreter, on the one hand, reads the configuration files generated by the editor in the predetermined format, making a distinction between an initial configuration, a reconfiguration or a deconfiguration, then converts these files into configuration commands for the platform in which it is located, and finally executes the desired configuration of this platform, and, on the other hand, reads the effective configuration of the platform, then generates configuration files in the predetermined format which contain the configuration information for the components of this platform, which configuration files can be used by the editor.

Thus, the instant system, which is consistent with object-oriented technology, allows automatic software configuration in servers or machines working in complex environments in the client-server mode in accordance with a distributed architecture and offers a global configuration service to users wishing to rapidly deploy a large number of systems from a single point. In effect, according to the concept of the invention, from a single point in the same console of a work station, it is possible to prepare a reference configuration which can be duplicated in different machines, or to specifically configure any station, that is any machine or platform of a heterogeneous group in the network, since the interpreter, in an intelligent way, in contrast with what occurred in the prior art, automatically discriminates between the initial configuration parameters and the parameters specific to the desired configuration, appropriately choosing the latter. This desired configuration of the platform is prepared on the console of a microcomputer using a user-friendly application of the "Windows" type to fill in one or more forms or "pages" of information on the screen related to the topology and the various parameters desired, simply by making selections on the screen, in order to design the topology of the network, set parameters such as the site, the machine, the connections, the addresses, the ports, the options, etc., thus creating an image of the desired configuration which, after the generation of a configuration file, is transmitted to the machine into which it will be loaded in order to be executed. The interpreter allows this loading and advantageously distinguishes between what exists and what is desired, and while moreover, this configuration can be controlled and monitored from the microcomputer. It is important to emphasize the "intelligence" of the interpreter, which is able to identify the present configuration and, as a function of the desired configuration transmitted, to recognize whether it is an initial configuration, a reconfiguration or a deconfiguration so that it can execute the appropriate command. It is also possible to automatically configure similar servers in order to complete or modify an infrastructure, simply by using loading means such as a diskette, electronic file transfer means, or services common in a network of the TCP/IP (Transmission Control Protocol/Internet Protocol) type. This novel, homogeneous and centralized concept of customized configuration, allows the opening of new configurable objects, thus facilitating deployments or migrations that are not currently possible, including the deployment of applications from a service integrating client. This last characteristic of extensibility is rendered possible by the fact that configuration dialogues and specific commands can easily be created, and thus new objects can be added via the designer, which is precisely the object. Up to now, such advantageous user-friendliness was impossible in networks of heterogeneous systems in a distributed environment. Numerous advantages ensue from the embodiment of the concept of the invention, among which are the extreme simplicity of its utilization and application of the configuration procedures, and the greater visibility of the installed configuration due to the fact that the graphical representation of this configuration is displayed directly on the screen. In addition, the learning period for the utilization of such procedures as well as the skill required for their execution can be considerably reduced, even relative to a wide deployment of systems, whether or not they are to be duplicated, in sites which are randomly distributed geographically. Moreover, productivity and efficiency are markedly improved since the administrator makes it possible to configure the networked systems easily and rapidly, while the automation of the process and the duplication capabilities are far superior, thus making it possible to reduce costs and lead times. A consistent global configuration, combined with the fact that less skill is required to install the software necessarily implies better control by the administrator of the management of systems deployment, which has the principal effect of improving overall reliability. Moreover, a great deal of autonomy is permitted for a user client who, having purchased a software package, can install it himself immediately, since he will not need any systematic technical assistance. Finally, in this complex environment in the client-server mode, the editor advantageously supplies powerful and practical mechanisms such as, in particular, mechanisms for controlling the uniqueness of an object and thus of the data in the network represented so that, for example, an address of a server distributed through the network can be updated simultaneously throughout this entire network.

To this end, the system according to the invention advantageously implements a process for configuring preconfigured software, in that it is divided into a plurality of subprocesses, including a subprocess for editing the knowledge base which enables the user of a work station to access the knowledge base in order to create, edit, modify and record this base, a subprocess for determining the configuration which enables the user of a work station to construct a desired configuration, a subprocess for updating the desired configuration in the station to be configured, a subprocess for analyzing and controlling the configuration in the configured station, and finally, a subprocess for scanning the configuration of a configured station from a work station.

Thus, the configuration process implemented by the system according to the invention is split into several subprocesses. A first subprocess for editing the knowledge base, which is independent from the other subprocesses and which makes it possible to construct a knowledge base, modify it and cause it to evolve, as desired. A second subprocess for determining the configuration which, once it has been executed in the work station, is followed by a third subprocess for updating the configuration in order to effectively implement this configuration in and by means of the platform to be configured. Finally, a fourth subprocess for analyzing and controlling the configuration in a configured station which, once it has been executed in this station, is followed by a fifth subprocess for scanning the configuration of the configured station from a work station, which makes it possible to extract and effectively import the configuration from this configured station.

BRIEF DESCRIPTION OF THE DRAWING

The following description in reference to the appended drawing, given as a non-limiting example, clearly explains how the instant invention may be implemented.

The single FIGURE schematically represents the elements which form the system for configuring preconfigured software in open systems according to the invention.

DETAILED DESCRIPTION OF THE PREFERRED EMBODIMENTS

To allow better comprehension of the concept of the invention, some generalities and definitions are offered below which will make it possible to place this invention in the proper context and to precisely understand the vocabulary used. The system for configuring preconfigured software was designed to provide a simple, inexpensive and efficient solution to the complex problems encountered when desiring to implement the migration and/or deployment as well as the updating of a large number, preferably greater than or equal to ten, of networked heterogeneous systems in a distributed environment. This configuration system makes it possible to deploy this large number of interconnected systems or servers quickly and easily since it provides a configuration environment which allows the software configuration to be prepared outside the administrated site or sites in which the systems to be configured are located, by offering capabilities for duplication in the plurality of sites involved and for repeated, automatic parameterizations. From this point forward, the term "component" should be equated with a physical or logical entity of an information system such as the hardware, a piece of software, or a microprogram, the object of the system according to the invention being to configure components. A component is defined by a "class" constituted by a unique name and a set of attributes which, in common, define the available configuration information, with each attribute representing a part of the configuration information. The attributes describing the configuration of the same functionality are collected into so-called functional groups so that they can be referenced easily. The page or form of configuration information is, for the user, the view, that is the display on the screen, of a functional group, and it is by filling in this form that the user indicates the information necessary to the configuration of a functional group of a component. The components define the configuration of heterogeneous systems such as central processors, work stations of the PC type, or UNIX platforms. Each system can comprise any number of components of different classes. Each functional group of a class of components can be instantiated more than once, in order to describe multiple instances of a part of a component. By convention, a functional group is said to be "scalar" when it is instantiated only once, or "tabular" when it can be instantiated more than once. The various systems are connected to the network they belong to through "links", which are either point-to-point (for example, X.25 link) or multipoint or federative (for example, Ethernet, FDDI, "token ring"). To be specific, a point-to-point link makes it possible to connect a system to another system or a system to a federative link, while a federative link is connected to a group of systems through an intermediate point-to-point link.

Figure 1:
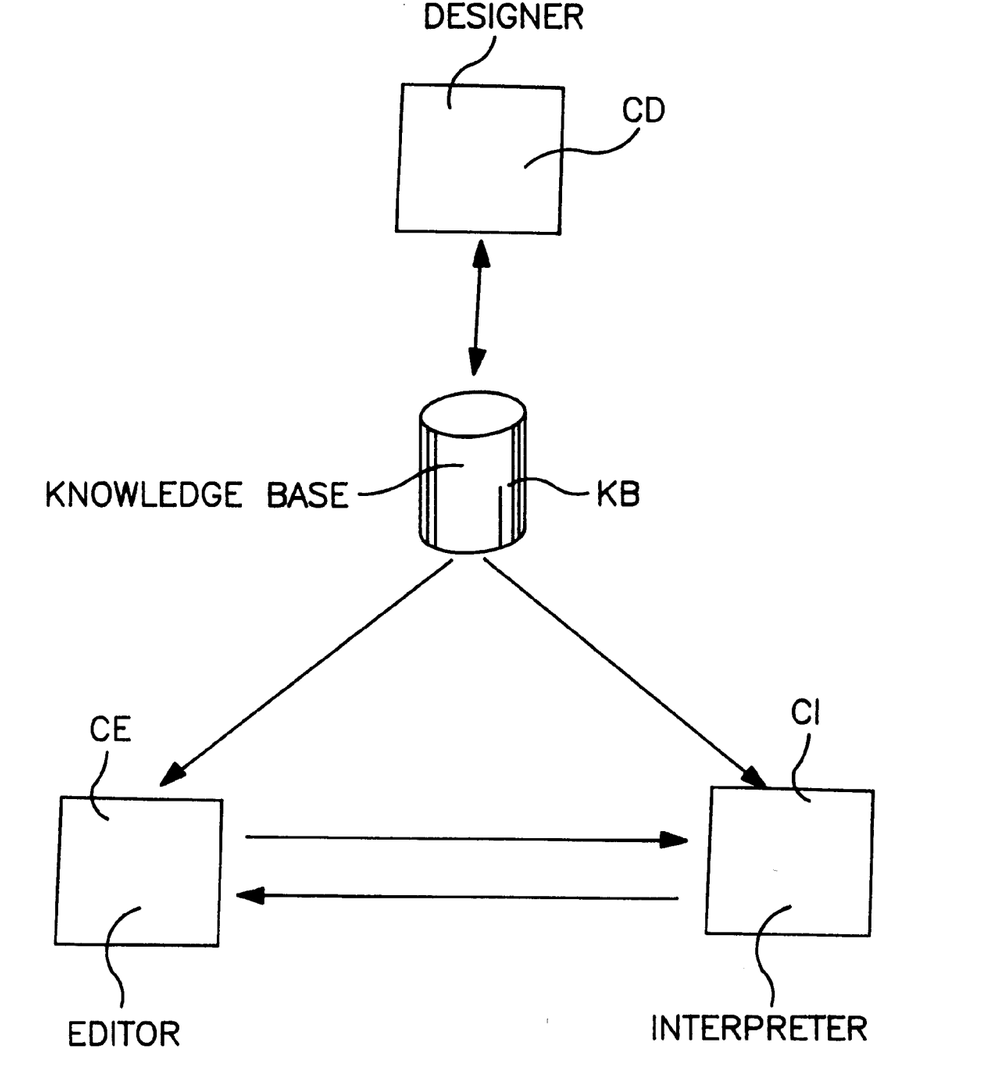

The sole FIGURE represents the various elements which compose the system for configuring preconfigured software according to the invention. This system is constituted, on one end, in a work station (not represented), by a design device CD called a designer, an editor CE and a knowledge base KB, and on the other end, in a station to be configured (not represented), by an interpreter CI, and the designer CD allows read and write access to the knowledge base KB which contains the data describing the various elements of the network which can be configured and the links between these various elements (systems, components, functional groups, etc.), which designer makes it possible to define the various configuration capabilities of the editor CE on which the desired configuration is displayed, which editor uses the information in the knowledge base KB related to the topology of the network and the configuration parameters of the various elements which compose the network to construct a configurable homogeneous entity which can be loaded, using loading means (diskette, electronic file transfer means, or services common in a network of the TCP/IP type), into the station to be configured, in which the interpreter executes the configuration operations, transforming the initial configuration parameters into parameters specific to the desired configuration which can also be used by the editor CE, which system implements a process for configuring preconfigured software.

From this perspective, the designer CD located in the work station of the PC type is designed like a graphical user interface of the Windows type, making it possible to determine, in a simple way, what can be configured by the editor CE. In fact, the editor CE uses a set of well defined resources, whereas the user, while the editor is executing its configuration tasks, manipulates on the one hand the platform classes, the purpose of each platform class being to define a system type, and on the other hand the components. One important function relates to the capabilities for extending the configuration system by adding, modifying or deleting objects in the knowledge base KB, and the designer makes it possible to define new platform classes and new component classes, thus authorizing the extension of the knowledge base KB used by the editor CE. For this purpose, the designer CD offers various capabilities, including those for defining, modifying or deleting platform classes, and also those for defining, modifying or deleting system component classes and the pages of information associated with these classes, which information is used mainly by the editor CE. Finally, with respect to the component classes, it offers the capability to define, modify or delete information related to the desired configuration mechanisms acting on the platform classes, which information is used mainly by the interpreters CI in the stations to be configured. This type of mechanism, hereinafter called a "component instrumentation", specifies the way in which to configure a component class and in fact corresponds to an interface used to bind (set), as in an installation or robustness test, or read (get), as in an inventory or analysis test, the configuration information related to a hardware or software component or to a page of information related to a scalar or tabular functional group. It is also important to note that the concept of a configurable software component is comparable to the concept of an installable software product.

Likewise, the editor CE located in the PC-type work station is designed like a graphical user interface of the Windows type, making it possible to process the configuration information related to a set of defined components. These main functionalities consist, first of all, of providing the user with graphical means for constructing on the screen a topology of the network which can contain any group of interconnected heterogeneous systems, and for each system represented, a page or a set of pages of configuration information is filled in with the information related to the components which make up this system. The result of this displayable construction operation is the configuration (systems and links). The editor is also designed to provide mechanisms for saving, opening and restoring the configurations defined by the user as well as mechanisms for controlling the uniqueness of an object in the network represented, allowing the same part of the configuration information to be entered once and only once. Moreover, for a configuration specified by the user, the editor makes it possible to generate a set of configuration files in a predetermined format. Preferably, the file used is in the format MIF (Management Interface Format) standardized by the consortium DMTF (Desktop Management Task Force), a format which makes it possible to describe hardware or software components in terms of objects and attributes. These files are used to generate a piece of configuration information which is executed in the desired configured platform. It must be noted that although these pieces of configuration information are different from one platform to another, the same files generated by the editor for a given configuration are used to generate the configuration information for all the platforms to which this configuration applies. Finally, from a set of configuration files imported from a configured platform, the editor makes it possible to extract the actual configuration of this platform, which means that the pages of configuration information for the components of the platform can be edited using the editor, and that when it is introduced into a configuration, the platform is appropriately connected to the other elements with this configuration, a fact which is deduced from the configuration data of this platform. The editor distinguishes between an initial editing of a new object (platform, product, information page) which corresponds to the creation of a graphical representation, and the updating of this graphical representation by taking into account the new parameters or the destruction of the component or the information page, if either of these are absent in the new parameters.

Also, the interpreter CI located in the station to be configured uses the information and the functions offered by the knowledge base KB and regardless of the platform type, it has a dual read functionality. On the one hand, it reads the configuration files generated by the editor in the predetermined format, preferably in the MIF format, making a distinction between an initial configuration, a reconfiguration or a deconfiguration, converts these files into configuration commands for the platform in which it is located, and then executes the desired configuration of this platform. On the other hand, it reads the effective configuration of the platform, then generates the configuration files in the predetermined format, preferably in the MIF format, which contain the configuration information for the components of this platform, which configuration files can be used by the editor. During a configuration, the interpreter can, if necessary and if desired, rename the machine in order to customize it, that is give it a different name from the one given by the manufacturer, and also, if desired, to restart the machine (UNIX "reboot" command) after the configuration.

In a preferred mode of implementation, the work station in which the designer CD and the editor CE are installed is a PC or PC-compatible platform which supports at least one system environment of the Windows 3.1 type, while the station to be configured, which comprises the interpreter CI, is a UNIX platform.

Advantageously, the system according to the invention implements a process for configuring preconfigured software which is unique in that it is divided into a plurality of subprocesses, including a subprocess for editing the knowledge base which enables the user of a work station to access the knowledge base in order to create, edit, modify and record this base, a subprocess for determining the configuration which allows a user of a work station to construct a desired configuration, a subprocess for updating the desired configuration in the station to be configured, a subprocess for analyzing and controlling the configuration in the configured station, and finally, a subprocess for scanning the configuration of a configured station from a work station.

A more precise definition of the knowledge base, and in particular of its functional content, will make it easier to understand how the internal data are manipulated by the subprocesses implemented by the configuration system, which data contained in the knowledge base describe the entities that can be configured as well as the connections between these entities. Thus, what follows are explanations related to a plurality of entities and their interconnections which the knowledge base makes it possible to describe.

Any information system can be modeled by means of a platform class designed to identify platforms which have similar configuration characteristics, and a platform class can be defined by:

a name which identifies it in a unique way within the knowledge base, which name identifies, for example, a type of machine, and which name information is compulsory, an external comment linked to the platform class, which comment can be accessed by the user of the editor, and which information is optional, an internal comment linked to the platform class, which comment can only be accessed by the user of the designer and is inaccessible to the user of the editor, which information is optional, a graphical icon representing the platform class, which information is optional.

The product or element to be configured is seen as a component defined by the class to which it belongs. For this reason, a component class is completely defined by:

a name, information which is compulsory, a version number, in VRMF (Version Release Maintenance Fix) form, which makes it possible to identify the version of the component according to a predetermined, standardized format, which information is compulsory. A component class is identified in a unique way in the knowledge base by the name/version combination, a function for analyzing the component, executed in the analyzed UNIX platform, which has two input parameters, the name and the version of the component, and which returns a null value when the component is located in the machine or a value different from zero when it is not, an external comment linked to the component class, which comment can be accessed by the user of the editor, which information is optional, an internal comment linked to the component class, which comment can only be accessed by the user of the designer and is inaccessible to the user of the editor, which information is optional, a graphical icon representing the component class, which information is optional.

A functional group is completely defined by the following data:

a functional group name which identifies in a unique way the functional group in the knowledge base, which information is compulsory, a piece of data indicating whether the functional group is scalar or tabular (by default, the functional group is scalar), which information is optional, a piece of data indicating whether or not the functional group is compulsory in the component, an instance of the compulsory functional group being created when the component is added to a system using the editor, an external comment linked to the functional group, which comment can be accessed by the user of the editor, which information is optional, an internal comment linked to the functional group, which comment can only be accessed by the user of the designer and is inaccessible to the user of the editor, which information is optional, a graphical icon representing the functional group, which information is optional.

An attribute is completely defined by the following data:

the internal name of the attribute, which is unique relative to the other attribute names, the syntax of the attribute, which can be chosen from a list of values, which information is compulsory, an internal comment linked to the attribute, which comment can only be accessed by the user of the designer and is inaccessible to the user of the editor, which information is optional, depending on the syntax, the specification of verifications of the value entered by the user for this attribute: for an integer a minimum value and/or a maximum value, for a character string the exact minimum and/or maximum number of characters, for an enumerative list the execution of an implicit control wherein the values outside the list of permissible values are rejected.

The component instrumentation is a low-level interface specific to the component class used to bind ("set" type function) or read ("get" type function) a piece of configuration information related to any component in this class. The component instrumentation is implemented by the supplier of the component, and the definition of the component instrumentation is recorded in the knowledge base and directly linked to the component class. The component instrumentation for a component class is constructed from a set of instrumentations known as functional group instrumentations which are defined for the functional groups which constitute this component class. Consequently, defining a component instrumentation corresponds to defining an instrumentation for each of the functional groups which constitute the component class, and the implementation of a component instrumentation therefore depends on the types of systems configured with the configuration system. The instrumentation of a functional group can consist of either a set of configuration commands, or of a number of configuration files, no matter what types of platforms are configured. The instrumentation of any functional group which it is desirable to integrate into the configuration system must conform to a set of rules, which rules are listed below for each type of instrumentation (command/file). The instrumentation of functional groups makes it possible to execute the following functionalities:

execute a preparation command, execute a posterior command, read the value of a set of attributes specific to the functional group, bind the value of a set of attributes specific to the functional group, for a tabular functional group, create an instance of this functional group, for a tabular functional group, read a list of all the instances of this functional group, for a tabular functional group, delete one or more instances of this functional group.

As for the configuration of UNIX platforms, in some cases, the functionalities listed above can be fulfilled by configuration commands, and in particular, it is possible to consider the commands in the SMIT interface which make it possible to execute configuration tasks in any platform which supports the AIX operating system. The configuration system according to the invention, which naturally allows commands of this type to be used but in a more efficient way, also offers rules for the commands which define the instrumentation of a functional group, such as the following:

these commands are not interactive, they make it possible to correspond and adapt to the SMIT concept, and for this purpose the user of the designer defines functional groups within the components so as to allow the configuration commands to conform to this concept, the command which makes it possible to read the list of names of functional group instances returns these names in such a way that the names returned are used as input parameters of the command, thus allowing the execution of the reading, and in such a way that there is only one functional group instance name per line, the command which makes it possible to read the attribute values for a functional group instances returns these values in the same format as SMIT, using a separator character, the order of the return being the same as the order of the attributes in the functional group and the values returned being revealed as such by the editor.

The configuration system is also designed to allow the integration of configured components using configuration files. For this purpose, the rules related to the instrumentation of files are the following:

the configuration files are ASCII files, each functional group must be instrumented by one and only one configuration file, the smallest element of any configuration file which instruments a functional group instance is the line, which means that a functional group instance is represented by at least one line in the configuration file linked to this functional group.

Thus, in conformity with the preceding rules, the instrumentation of a functional group for UNIX platforms using configuration files is completely defined (and thus stored in the knowledge base) by:

a name which identifies the instrumentation in a unique way, the instrumentation template linked to the configuration file for the functional group and specified by the user of the designer, the syntax of which template takes into account the tabular functional groups, the integral name of the path leading to the repertoire in which the configuration file must be read, the integral name of the path leading to the repertoire in which the configuration file must be written, the write mode for the configuration file: "append" if the configuration file is added to a file which already exists in the configured platform, or "overwrite" if the configuration file replaces a file which already exists in the configured platform.

There is always an information page associated with the functional group when this functional group is configured using configuration files. The instrumentation has no effect on the preparation of the configuration executed in the work station, but mainly has an effect the processes applied to construct the desired configuration of a platform, that is, on the subprocesses for updating the configuration and for analyzing and controlling the configuration.

The format used must correspond to the format of the configuration data introduced; on one end any configuration data element is seen in the format predetermined by the user of the editor, whereas the same configuration data element is seen in another format, called the product format, on the interpreter end.

Moreover, the configuration data must specify the link types manipulated by the user of the editor, and the various link types are completely defined by the following data:

a name which identifies the link type in a unique way, the characteristics of this link, whether it be a point-to-point link for connecting a system to another system or connecting a system to a federative link, or a federative link for interconnecting a group of systems through intermediate point-to-point links, a graphical icon representing the link type, which information is optional, an external comment linked to the link type, which comment can be accessed by the user of the editor, which information is optional, an internal comment linked to the link type, which comment can only be accessed by the user of the designer and is inaccessible to the user of the editor, which information is optional.

These data must also specify a set of components, with their version numbers properly attached, which are specific to a platform class that is also adequately defined, and which are indicated by the following:

a name which identifies them in a unique way, a name identifying the platform class for which they are intended to be used, the list of name/version number combinations identifying each of the components to which these data apply, an external comment linked to this set of components, which comment can be accessed by the user of the editor, which information is optional, an internal comment linked to this set of components, which comment can only be accessed by the user of the designer and is inaccessible to the user of the editor, which information is optional.

This concept of a set of components is intended to accelerate the specification, by the user of the editor, of the presence of a set of products in a platform, after which each component in any set of components is manipulated in its entirety.

These data must also specify a list of components and are thus used to define, in configuration terms, the dependency of a component relative to a set of components. Such a dependency in configuration terms is identified by:

the name which identifies this dependency in a unique way, the name which identifies every component class belonging to this configuration dependency, all of version numbers linked to this component class.

A component class is linked to a configuration dependency by the component/dependency relation.

The component/dependency relation makes it possible to obtain a list of all the components, according to name/version combination, which may be located in any platform of a given class. This relation is completely defined by:

the name identifying the platform class, the name of the component class in relation to this platform class, the version number of the component class in relation to this platform class.

The relation between a platform class and a component class is defined only if these two classes are defined in the knowledge base.

The data must also specify a component/dependency relation between a component class and a list of component classes in the knowledge base. This relation expresses, on the one hand, the predetermined conditions to be met relative to the other components so that a component can be configured, since some of the components require the presence of other components in order to be configured, and on the other hand, the compatibility that a component must have relative to other components. This relation is completely defined by:

the name identifying the predetermined component class, the name identifying the configuration dependency linked to the name of the predetermined component class.

Each attribute is intended to define part of a piece of configuration information; consequently, an attribute is linked to a large number of functional groups of the same component or of different components. Conversely, a functional group is linked to a large number of attributes. Certain data are thus used to define this attribute/functional group relation, which data are the following:

the internal name of an attribute which identifies it in a unique way, the name identifying the functional group linked to the attribute, the name of the attribute in the functional group, known as the external name of the attribute, which is the name displayed for the user of the editor, an indicator or flag indicating whether the attribute is compulsory in the functional group, that is whether a value of this attribute must be supplied when an instance of this functional group is configured, a comment, typically a help message, linked to the attribute when this attribute is sought in this functional group, which the user of the editor can access in order to obtain information on this attribute in the context of a functional group, which information is optional; when it is not present, the comment for the attribute is used, a default value associated with the attribute in the functional group.

It must be noted that a functional group instance is named by the value of the first attribute defined for this functional group.

An instrumentation always refers to a functional group of a component, and this relation is intended to link an instrumentation to a functional group belonging to a component class. Consequently, the relation between an instrumentation of a functional group and this functional group is described by the following data:

the name of the component class which includes the functional group, the version number of this component class, the name identifying the instrumentation, the name identifying the functional group linked to this instrumentation.

A component is constituted by a set of functional groups, and this relation links a functional group to a component, indicating that the functional group is contained in the component. Consequently, the relation between a functional group and the component to which it belongs is described by the following data:

the name identifying the functional group, the name of the class of components which includes the functional group, the version number of this component class.

Once these details related to the knowledge base are provided, it is easier to understand the object of the various subprocesses applied according to the invention. Thus, the object of the subprocess for editing the knowledge base is to provide the user of a PC-type work station with access to the knowledge base, enabling him to create this base from nothing, to edit it, to modify it, and to record it.

Since the knowledge base is linked to a work station, the user must be able to preserve the integrity of a work station at another work station in order to prevent any redundancy relative to the names and the versions.

This subprocess for editing the knowledge base uses, as input data, the data of the knowledge base recorded in the work station as well as the data from the user for modifying the contents of the knowledge base. The data from the user are entered through the graphical user interface of the designer, which is the input interface for the data flow as well as the control interface. This subprocess also uses the data in the knowledge base as output data. All the functionalities of the designer that are specific to the user interface and to the functions of the "kernel" as well as the data from the user related to the desired configuration are used. From this point forward, for purposes of simplification and conciseness, the input interface for the subprocess for editing the knowledge base with regard to the input data related to the knowledge base, will be called the knowledge interface. Thus, during a creation operation, the operation specific to the tasks for initializing the knowledge base is executed, while the output data, which at this moment do not exist, correspond to an empty knowledge base. Also, during an editing operation, the data in the knowledge base are treated as input data and the data supplied as output are the data in the knowledge base edited using the graphical user interface of the designer. Likewise, during a modification or deletion operation, the data in the knowledge base are treated as input data, as are the desired configuration data entered by the user, whereas the data provided as output are the data in the modified knowledge base. Finally, during a recording operation, it is possible to save the knowledge base by recording the data in this knowledge base. This subprocess is executed entirely by the designer in the configuration system, and it is important to note that the designer can manipulate several knowledge bases, and that also in this case, the editor can link a configuration to a knowledge base.

The subprocess for determining a configuration makes it possible to construct a desired configuration using the editor of the configuration system. For this editor, a configuration corresponds to a heterogeneous group of platforms which are interconnected by means of links, which configuration is entered by means of information pages which make it possible to identify the components associated with these platforms, with the understanding that a given configuration is always linked to the knowledge base.

The determination of a configuration is a user operation which consists of the step-by-step construction, starting with an existing configuration or with no configuration, of a predetermined configuration, wherein the subprocess provides the user with the means to determine this configuration. For this purpose, in a first step, the user optionally selects a configuration which is identified in a unique way by a name and a version number, preferably in the VRMF format. It will be recalled that, since the configuration is executed in a work station, the user must be able to preserve the integrity of the predetermined configurations of a work station at another work station. In a second step, the user constructs or modifies the topology of the network on the screen, that is, he specifies the platforms and connects them to the network by means of links. Then in a third step, he selects a platform, specifies the components which are installed in this platform, defines the functional group instances, and enters configuration information for each instance on the appropriate information pages. This operation is repeated for each platform that the user wishes to configure or associate with the overall configuration. Finally, in a fourth step, he implements the configuration by generating the MIF-type configuration files which are distributed in each configured platform.

To be specific, the control interface is the graphical user interface of the editor. All of the functionalities of the editor that are specific to the user interface and to the functions of the "kernel", some of the functionalities specific to the "kernel" of the designer for access to the knowledge base, as well as the data from the user related to the desired configuration are used. Thus, the input data necessary to the application of the subprocess for determining a configuration are the following:

the knowledge base recorded in the PC-type work station, the interface which allows access to this base being the knowledge interface, the topology data and the configuration data which are entered by the user through the graphical user interface of the editor, the name of the configuration, if a currently existing configuration is being edited, which information is optional.

Thus, during a creation operation, the operation related to the initialization of any configuration is executed, while the output data, which at this moment do not exist, correspond to an empty configuration, and a reading of information in the knowledge base through the knowledge interface is necessary. Also, during an editing operation, the name of the configuration entered through the graphical user interface of the editor as well as the data in the knowledge base entered through the knowledge interface are treated as input data, and all of the data corresponding to currently existing configurations are also treated as input data from which the configuration desired by the user is extracted, while the output data supplied through the graphical user interface of the editor correspond to the configuration desired by the user. Likewise, during an operation for modifying the topology and the configuration information, the configuration data entered by the user through the graphical user interface of the editor are treated as input data, in order to supply a modified configuration which is edited using the graphical user interface of the editor, with the operation for modifying the topology supplying the topology and the operation for modifying the configuration information supplying the configured topology. Finally, during an operation for implementing the configuration, the configured topology is treated as input data and the desired configuration is edited through the graphical user interface of the editor, which configuration is recorded in a set of configuration files, preferably of the MIF type, through the interface for writing the configuration files. The configuration files contain the following information:

the configuration information entered by the user, the structure of the components which are configured, the instrumentation.

In this complex environment in the client-server mode, it must be noted at this point that the editor advantageously supplies, among other things, a mechanism which implements the control of the uniqueness of an object and thus of the data in the network represented. Thanks to this mechanism, a user preparing a configuration in a work station of the configuration system need only enter the same configuration data once.

For this reason, the uniqueness mechanism of the configuration makes it possible to propagate the value of an attribute linked to a functional group instance to other attributes linked to other functional group instances, whether or not these instances are located in the same system. Consequently, sets of attributes are defined in a given configuration by sharing the same value, and each time an attribute is modified by the user, all the attributes belonging to the same set are modified automatically. Thus, since each attribute is identified internally in a unique way by an internal name, the attributes common to different functional groups will have the same internal name, and this characteristic is used to implement the uniqueness of the configuration. The following information, which is linked to an attribute, makes it possible to identify the functional group to which it belongs:

with regard to the system, the name of the system in which the functional group involved is located, with regard to the component class, the name of the component class which includes the functional group involved, with regard to the identifier of the functional group instance, the name of the instance of the functional group involved, with regard to the external name, the external name of the attribute in the functional group involved.

The part of the information related to the identifier of the functional group instance must be specified, since several instances of the same functional group share the same attribute identifier. The part of the information related to the system must be specified when an attribute value specific to a system is distributed to another system. The uniqueness of the configuration is rendered effective by the editor the moment the user fills in the information pages with the configuration data. It must be noted that this uniqueness must not be limited by the format of the input data. In effect, for the user of the editor, the same configuration data entered for different functional groups must have the same format, but from the point of view of the instrumentation, the same configuration data entered in order to configure different functional groups can have a different format. This format problem is advantageously solved by the communications infrastructure of the configuration system, particularly by the instrumentations. In fact, as explained above, the format used must correspond to the format of the configuration data entered; on one end any configuration data element is seen in the format predetermined by the user of the editor, whereas the same data configuration element is seen in another format, called the product format, on the interpreter end. This choice is handled by the instrumentations, whether the latter use commands or configuration files.

The subprocess for updating the desired configuration makes it possible to effectively implement this configuration in the station to be configured from the configuration prepared by the subprocess for determining the configuration. This functionality of the configuration system is implemented by the interpreter of the UNIX station to be configured. The object of this subprocess is to convert the abstract implementation of the configuration obtained by applying the subprocess for determining the configuration into an actual configuration of a desired configured station. After the application of this subprocess, this station is newly configured as prepared, from any prior configuration, if so desired. This subprocess makes it possible to take into account any type of configuration, an initial configuration (not a prior configuration), a reconfiguration which is a new configuration obtained from a or a configuration, or a deconfiguration, that is, a prior configuration reworked by having some of its elements deleted.

The interface for controlling this subprocess is in fact the interpreter of the station to be configured. The various elements used or taken into consideration for the application of this subprocess are the following:

the user responsible for the activation of the subprocess, although once activated, this subprocess requires no further human intervention, the interpreter which implements this subprocess, possibly the SMIT tool in an AIX platform which can also activate this subprocess, which subprocess can also be activated from a command interpreter (called a "shell" by one skilled in the art) through a command line interface (CLI) for UNIX platforms (whether or not they are AIX platforms).

The input data and the interface for this subprocess are constituted by the following elements:

the configuration files, preferably of the MIF type, which describe the configuration that the subprocess installs and the elements of the knowledge base used by the interpreter, which configuration files are accessed through an interface specific to the interpreter, the effective configuration of the product, that is, all the configuration data for all the products in the station, which configuration is saved and can be accessed in the station in specific configuration files; the interface which allows access to these input data is constituted by a set of specific commands, the name of the station to be configured entered by the user, which name corresponds to the name of the system specified in the configuration prepared by the subprocess for determining the configuration.

The output data and the interface of this subprocess are constituted by the following elements:

the new effective configuration of the product which, like the preceding, is saved and can be accessed in the station in specific configuration files, the records of the effective configuration, that is, the records containing the information related to the analysis of configuration tasks executed effectively, which also include all of the lines and the results of the commands.

During the application of the subprocess, three operations are executed in succession, an operation for verifying the configuration actually installed, an operation for analyzing the effective configuration relative to the contents of the configuration files and finally, an operation for activating the desired configuration.

The operation for verifying the configuration consists of executing the verifications related to what is actually installed in the station, and for this purpose analysis functions described in the transmitted configuration files are used to verify the total consistency between the effective configuration of the station and the information contained in the configuration files, which are preferably of the MIF type, in terms of product contents and version numbers. Consequently, the input data here are the name of the system as well as the elements of the knowledge base contained in the configuration files.

The operation for analyzing the effective configuration consists of comparing the effective configuration of the station to the contents of the configuration files by generating the appropriate actions. For this purpose, for each component whose description is given in the configuration files, the contents of these configuration files are compared to the effective configuration. Likewise, for each functional group of each component listed in the configuration files, the instances actually configured are determined; if the instances are configured but are not present in the configuration files, they are deleted; if the instances are present in the configuration files but are not configured, they are created; if the instances are both configured and present in the configuration files, they are modified. Then when necessary, that is, for a creation or a modification, the keywords which specify the instrumentations are replaced by the values found in the configuration files. Finally, the order in which the configuration of the functional groups in a component and the configuration of the components are executed is determined.

The operation for activating the desired configuration consists of activating the configuration from input data constituted by the information resulting from the preceding analysis operation. Activating the configuration means installing the configuration files in the proper place in the configured station and executing the configuration commands imported during the preceding analysis operation.

The subprocess for analyzing and controlling the configuration in the configured station makes it possible to import the configuration of this station and to supply the configuration information in an easily accessible format to the subprocess for scanning the configuration of a configured system from a work station. This functionality of the configuration system is implemented by the interpreter of the configured UNIX station. Therefore, the control interface for this subprocess is the interpreter in the configured station. For the application of this subprocess, the various elements used or taken into consideration are the following:

the user responsible for the activation of the subprocess, although once activated, this subprocess requires no further human intervention, the interpreter which implements this subprocess in a predetermined configured station, possibly the SMIT tool in an AIX platform which can also call this subprocess, which subprocess can also be activated from a command interpreter ("shell") through a command line interface (CLI) for UNIX platforms (whether or not they are AIX platforms).

The input data and the interface for this subprocess are constituted by the following elements:

the part of the knowledge base which describes the UNIX stations; access to this base is mad possible by an interface specific to the interpreter, which is the same interface used by the subprocess for updating the desired configuration, which part of the knowledge base represented in the configuration files, preferably of the MIF type, comprises: the list of all the components (names and versions) contained in the knowledge base, including the function for analyzing the components, the description of the functional groups involved as well as the instrumentations linked to the functional groups, the effective configuration of the product, that is the configuration data for all the products in the station, which configuration is saved and can be accessed in the station in specific configuration files; the interface which allows access to this input data is constituted by a set of specific commands, also known as component instrumentations, which component instrumentations are imported from the part of the knowledge base predetermined for the present subprocess.

The output data and the interface for this subprocess are constituted by configuration files, preferably of the MIF type, which describe the configuration of the analyzed station, which configuration files contain the configuration information of the components installed in the station.

During the application of this subprocess, three operations are executed in succession, an operation for analyzing the station, an operation for reading the configuration data, and finally an operation for creating configuration files.

The operation for analyzing the station consists of determining a list of the components installed in the analyzed station and retrieving the name and the version of each component using the analysis function imported into the knowledge base. Consequently, the input data in this case are the data from the knowledge base contained in the configuration files and the output data is the list of components.

The operation for reading the configuration data consists of importing the configuration data specific to the products installed in the station, which input data are the following:

the data in the knowledge base from which, for each component, the following are extracted: on the one hand, for the functional groups whose configuration is implemented by commands, the commands which make it possible to read the list of the functional group instances constituting the component, as well as for each functional group instance, the list of the attribute values, and on the other hand, for the functional groups whose configuration is implemented by the configuration files, these configuration files, a list of the components located in the analyzed station, supplied during the operation for analyzing the station.

The output data supplied for executing the operation for creating configuration files are therefore the configuration data of the products presented in an internal format.

The operation for creating configuration files consists of using, as input data, the output data generated during the operation for reading the configuration data, and of executing the following tasks:

for each component, constructing all the configuration files, preferably of the MIF type, which contain the configuration data of this component in a predetermined format, for all of the components, constructing a tree of all the configuration files in the predetermined format, recording this tree at a location specified by the user.

The subprocess for scanning the configuration of a configured station from a work station makes it possible to edit, in the editor of this work station, the configuration of any configured and analyzed station. This subprocess makes it possible to insert the configuration of the analyzed station into a configuration edited in the work station, insert in this case meaning:

to display the configuration of the analyzed station in the diagram of the configuration, to bind the configuration of the analyzed station to the representation of the network, given the configuration data of this system, to edit the configuration data imported through the graphical user interface.

This subprocess, which has characteristics in common with the editing operation executed during the application of the subprocess for determining the configuration, is implemented by the editor. The control interface for this subprocess is therefore the graphical user interface of the editor; likewise, all of the functionalities of the editor specific to the user interface and to the functions of the "kernel", some of the functionalities specific to the "kernel" of the designer for access to the knowledge base, as well as the data from the user related to the desired configuration are used. Thus, the input data necessary to the application of this scanning subprocess are the following:

the knowledge base recorded in the PC-type work station, the interface which makes it possible to access this base being the knowledge interface, the configuration files, preferably of the MIF type, generated by the subprocess for analyzing and controlling the configuration of the configured station, which are read using the interface for reading the configuration files, the data structures which specify the edited configuration into which the configuration of the analyzed station is inserted.

The output data supplied by the scanning subprocess specify the edited configuration to which the configuration of the analyzed station has been added.

During the application of this subprocess, three operations are executed in succession, an operation for reading the configuration data, an operation for connecting to the network represented, and finally a display operation.

The operation for reading the configuration data consists of verifying that the configuration is suitable for the knowledge base and of filling in the internal data structures with the contents of the configuration files, which data structures representing the configuration of the analyzed station are used to execute the subsequent connection and display operations. For this reason, the input data used are the data in the knowledge base and the configuration files accessed through the interface for reading the configuration files.

The operation for connecting to the network represented consists of examining the edited configuration as well as the configuration data of the analyzed station and of determining the links which make it possible to connect the analyzed station to other stations present in the edited configuration. For this purpose, the input data used are the data structures representing the edited configuration and the data structures representing the configuration data of the analyzed station. This connection operation modifies the data structures representing the edited configuration when the links are completed.

The display operation consists of designing the new topology after inserting the analyzed station, including the graphical representation of the analyzed station, the graphical representation of the links which make it possible to connect the analyzed station to the network, and the representation of the configuration data of the analyzed station in the information pages. For this purpose, the input data used are the data structures representing the edited configuration, modified by the preceding connection operation.

The principal interactions between these various subprocesses are explained below. A first interaction occurs during the passage from the subprocess for determining the configuration to the subprocess for updating the desired configuration in order to execute the preparation of the configuration, its distribution, and its effective determination. The configuration files are generated by the subprocess for determining the configuration, and all of the configuration files are then transferred from the work station to the station to be configured, in which the subprocess for updating the desired configuration is implemented, either by means of diskettes or using electronic file transfer means. These files are ASCII files and the same set of files is transferred to all the stations to which the desired configuration applies. With a UNIX application, when a file transfer is achieved by means of a diskette, the files are copied in each of the stations involved by the subprocess for updating the desired configuration, using a UNIX command (dosread). The configuration files of the MIF type contain all the information necessary to the configuration of the stations to which this configuration applies, and the contents of these files, for all the components to be configured, are the following:

the description of the linked functional groups, the instrumentations linked to the functional groups, the configuration data for the configured functional groups, the order of configuration between the functional groups and the components, which order is extracted from the knowledge base.

A second interaction is described relative to the passage from the subprocess for analyzing and controlling the configuration to the subprocess for scanning the configuration of a configured station from a work station in order to execute the analysis of the configuration. The configuration files of the MIF type containing the data of the knowledge base are necessary to the application of the subprocess for analyzing and controlling the configuration. It is up to the user to supply these files and to indicate their location in the stations. Moreover, the editor gives the user the ability to produce the configuration files of the MIF type containing the data of the knowledge base, for any station, and to insert them onto a diskette or other means. These configuration files of the MIF type contain all the information necessary to extract the effective configuration of any station, and the contents of these files are the following:

a list of all the components contained in the knowledge base, including the function for analyzing the components, the description of the linked functional groups, the instrumentations linked to the functional groups.

The subprocess for analyzing and controlling the configuration generates the configuration files of the MIF type representing the configuration of the analyzed station and stores them in the repertoire specified by the user. The structure of these MIF-type configuration files is the same as that generated by the editor. All of the files are transferred from the analyzed station by the subprocess for analyzing and controlling the configuration to the work station, using either diskettes or electronic file transfer means. With a UNIX application, when a file transfer is executed by means of a diskette, the files are copied onto the diskettes by the subprocess for updating the desired configuration using a UNIX command (doswrite).

A third interaction occurs during the passage from the subprocess for editing the knowledge base to the various subprocesses which require accesses to the knowledge base manipulated by this editing subprocess, which interactions are executed through the knowledge interface.

In conclusion, the system for configuring preconfigured software in open systems and the process implemented according to the invention make it possible to implement an automatic software configuration in servers or machines working in complex environments in the client-server mode in accordance with a distributed architecture and offers a global configuration service to users wishing to rapidly deploy a large number of systems from a single point. From a single point in the same console of a work station, it is possible to prepare a reference configuration which can be duplicated in different stations, or to specifically configure any station of a heterogeneous group in the network, and the interpreter, in an intelligent way, in contrast to what occurred in the prior art, automatically discriminates between the initial configuration parameters and the parameters specific to the desired configuration, appropriately and automatically choosing the latter. The desired configuration of the station is prepared on the console of a microcomputer using a user-friendly application of the "Windows" type to fill in one or more "pages" of information on the screen related to the topology and the various parameters desired, simply by making selections on the screen in order to design the topology of the network, set any type of parameter, and thus create the image of the desired configuration which, after the generation of configuration files, is transmitted to the machine into which it will be loaded in order to be executed, while the interpreter allows this loading and advantageously distinguishes between what exists and what is desired, and while moreover, this configuration can be controlled and monitored from the microcomputer. The adaptability and the intelligence of the interpreter make it capable of identifying the present configuration and, as a function of the desired configuration transmitted, to recognize whether it is an initial configuration, a reconfiguration or a deconfiguration so that it can execute the appropriate command. It is also possible to automatically configure similar servers in order to complete or modify an infrastructure, simply using known loading means. This novel homogeneous and centralized concept of customized configuration allows the opening of new configurable objects, thus facilitating deployments or migrations that are not currently possible, including the deployment of applications from a service integrating client. This last characteristic of extensibility is rendered possible by the fact that configuration dialogues and specific commands can easily be created and thus new objects can be added via the designer, which is precisely the object. Up to now, such advantageous user-friendliness was impossible in networks of heterogeneous systems in a distributed environment. Among the numerous advantages offered are the extreme simplicity of utilization and application of the configuration procedures, and the greater visibility of the installed configuration due to the fact that the graphical representation of this configuration is displayed directly on the screen. In addition, the learning period for the utilization of such procedures as well as the skill required for their execution can be considerably reduced, even relative to a wide deployment of systems, whether or not they are duplicated, in sites which are randomly distributed geographically. Moreover, productivity and efficiency are markedly improved since the administrator makes it possible to configure the networked systems easily and rapidly while the automation of the process and the duplication capabilities are far superior, thus making it possible to reduce costs and lead times. A consistent global configuration, combined with the fact that less skill is required to install the software, necessarily implies better control by the administrator of the management of systems deployment, which has the principal effect of improving overall reliability. Moreover, a great deal of autonomy is permitted for a user client who, having purchased a software package, can install it himself immediately, since he will not need any systematic technical assistance. Finally, in this complex environment in the client-server mode, the editor advantageously provides powerful and practical mechanisms such as, in particular, mechanisms for controlling the uniqueness of an object and thus of the data in the network represented.

While the preferred forms and embodiments of the invention have been illustrated and described, it will be apparent to those of ordinary skill in the art that various changes and modifications may be made without deviating from the inventive concepts and spirit of the invention.

We claim:

1. A system for configuring preconfigured software in an open system in a distributed environment, said network system including a work station having a designer, an editor, a knowledge base containing data describing various elements of the network that can be configured and links connecting the various elements, and, in a station to be configured, an interpreter, said system further including means for read and write access to the knowledge base by the designer, said designer including means for defining various configuration capabilities of the editor on which a desired configuration is displayed, said editor including means for using data in the knowledge base related to topology of the network and configuration parameters of the various elements which comprise the network to construct a configurable homogeneous entity which can be loaded, loading means for loading the configurable entity into the station to be configured, the interpreter including means for executing configuration operations and transforming initial configuration parameters into parameters specific to the desired configuration for use by the editor, and means for implementing a process for configuring the preconfigured software.

2. The system for configuring preconfigured software according to claim 1, wherein the designer further includes a graphical user interface of the "Windows" type for enabling new classes of platforms and new classes of system components to be defined to extend the data in the knowledge base used by the editor, and including means to define, modify and delete platform classes, system component classes and the pages of information associated with said classes, and with respect to the component classes, to define, modify or delete information in the platform classes related to the desired configuration.

3. The system for configuring preconfigured software according to claim 1, wherein the editor further includes a graphical user interface of the "Windows" type for supplying the user with graphical means for constructing on a screen a topology of the network representative all of the heterogeneous systems and their interconnections, wherein for each system represented, a page or a set of pages of configuration information is filled in, and further including means for saving, opening and restoring configurations defined by the user as well as means for controlling the uniqueness of an object in the network represented, said user interface further including, for a configuration specified by the user, means for generating a set of configuration files in a predetermined format, means for using said files to generate a piece of configuration information that is executed in a desired configured platform and means for extracting the actual configuration desired for said platform from a set of configuration files imported from a configured platform.

4. The system for configuring preconfigured software according to claim 1, wherein the interpreter further includes means for reading configuration files generated by the editor in a predetermined format, means for making a distinction between an initial configuration, a reconfiguration and a deconfiguration, means for converting said configuration files into configuration commands for a platform in which said system is located, and means for executing the desired configuration of said platform, said interpreter further including means for reading the effective configuration of the platform, and means for generating configuration files in a predetermined format which contains the configuration information for the components of said platform, said configuration files being usable by the editor.

5. A process for configuring preconfigured software implemented by a system for configuring preconfigured software in an open system network in a distributed environment, said system including, in a work station, a designer, an editor, and a knowledge base containing data describing various elements of the network that can be configured and links connecting the various elements, and, in a station to be configured, an interpreter, said system further including means for read and write access to the knowledge base by the designer, said designer including means for defining various configuration capabilities of the editor on which a desired configuration is displayed, said editor including means for using data in the knowledge base related to topology of the network and configuration parameters of the various elements which comprise the network to construct a configurable homogeneous entity which can be loaded, loading means for loading the configurable entity into the station to be configured, the interpreter including means for executing configuration operations and transforming initial configuration parameters into parameters specific to the desired configuration which can also be used by the editor, and means for implementing a process for configuring the preconfigured software, wherein said process comprises, dividing said process into a plurality of subprocesses, including initiating a first subprocess for editing the knowledge base to enable the user of a work station to access the knowledge base and create, edit, modify and store said knowledge base, initiating a second subprocess for determining a configuration which enables the user of a work station to construct a desired configuration, initiating a third subprocess for updating the desired configuration in the station to be configured, initiating a fourth subprocess for analyzing and controlling the desired configuration in the configured station, and initiating a fifth subprocess for scanning the desired configuration of a configured station from the work station.

6. The process for configuring preconfigured software according to claim 5, wherein the first subprocess for editing the knowledge base, executed by the designer in the work station, uses as input data, data of the knowledge base recorded in the work station and entered through a knowledge interface and data from the user for modifying the contents of the knowledge base, and further comprises the steps of entering said data from the user into the knowledge base through a graphical user interface of the designer serving as an input interface for data flow, as well as a control interface, using said data in the knowledge base as output data, using, during a first creation operation, functionalities of the designer and data from the user related to the desired configuration to execute an operation for initializing the knowledge base, at which point the knowledge base is empty and the output data does not exist, during a second editing operation, editing the data in the knowledge base and providing as output data the edited data in the knowledge base through the graphical user interface of the designer, further editing the edited data in the knowledge base during a third modification operation data in the input data along with the desired configuration data entered by the user, providing as output data knowledge base data and, in a fourth recording operation, saving the modified data in the knowledge base.

7. The process for configuring preconfigured software according to claim 6, wherein the second subprocess for determining the configuration allows the user of the editor of a work station to construct a desired configuration which corresponds to a heterogeneous group of platforms interconnected by means of links, wherein said process further includes entering the desired configuration by means of information pages to identify the components associated with said platforms, using the graphical user interface of the editor as a control interface, using, during a first creation operation, functionalities of the editor and functionalities of the designer for access to the knowledge base and data from the user related to the desired configuration to execute an operation related to initialization of any configuration, at which point the output data does not exist and the configuration is empty, treating as input data, during a second editing operation, the name of the configuration entered using the graphical user interface of the editor data in the knowledge base entered using the knowledge interface and data corresponding to already existing configurations from which the desired configuration is extracted by the user, while the data supplied as output data through the graphical user interface of the editor corresponds to the configuration desired by the user, treating the configuration data entered by the user through the graphical user interface of the editor as input data during a third operation for modifying the topology and the configuration data, in order to supply a modified configuration edited using the graphical user interface of the editor, with the operation for modifying the topology supplying the topology and the operation for modifying the information supplying the configured topology and during a fourth operation for implementing the configuration, treating the configured topology as input data and editing the desired configuration using the graphical user interface of the editor, and recording said configuration in a set of configuration files through the interface for writing configuration files.

8. The process for configuring preconfigured software according to claim 7, wherein the third subprocess for updating the desired configuration is implemented by an interpreter in the station to be configured, which interpreter is also a control interface, making a distinction between an initial configuration, a reconfiguration and a deconfiguration, and further wherein the input data and the interface for said third subprocess further includes configuration files which describe the configuration installed by the subprocess and the elements of the knowledge base used by the interpreter, access to said configuration files describing access to said configuration files being provided through an interface specific to the interpreter, said configuration files further describing the effective configuration of the product, which is saved and can be accessed in the station in specific configuration files, the interface for accessing said data being constituted by a set of specific commands and the name of the station to be configured entered by the user, and further wherein, the output data and the interface for said third subprocess includes the new effective configuration of the product which, is saved and can be accessed in the station in specific configuration files, and records of the effective configuration, and further wherein the input and output data are used during a first operation for verifying the configuration actually installed to verify the total consistency between the effective configuration of the station and the information contained in the configuration files, during a second operation for analyzing the effective configuration relative to the contents of the configuration files, comparing the effective configuration of the station to the contents of the configuration files and generating the appropriate actions, and during a third operation for activating the desired configuration, activating the configuration from input data including the information resulting from the preceding analysis operation, installing the configuration files in the proper place in the configured station and executing the configuration commands imported during the preceding analysis operation.

9. The process for configuring preconfigured software according to claim 8, wherein the fourth for analyzing and controlling the configuration implemented by the interpreter in the configured station enables importing of the configuration of said configured station and provides the configuration information in an accessible format to the fifth subprocess for scanning the configuration of a configured station from a work station, which interpreter is also the control interface, said input data and the interface for said fourth subprocess further including the part of the knowledge base which describes the station, access to which base is made possible by an interface specific to the interpreter which is the same interface used by the third subprocess for updating the desired configuration, and the effective configuration of the product, which configuration is saved and can be accessed in the station in specific configuration files, the interface which allows access to these input data including a set of specific commands, while the output data and the interface for said fourth subprocess include configuration files describing the configuration of the analyzed station, and further wherein input data and output data are used during a first operation for analyzing the station to determine a list of components installed in the analyzed station and to import a name and a version of each component, the input data being data in the knowledge base contained in the configuration files and the output data being the list of components, during a second operation for reading the configuration data, importing said configuration data specific to products installed in the station, the input data being data in the knowledge base and the list of the components located in the analyzed station being supplied during the operation for analyzing the station and the output data being the configuration data of the products presented in an internal format, and during a third operation for creating configuration files, treating as input data the output data generated during the operation for reading the configuration data and, for each component, constructing all of the configuration files which contain the configuration data of said component in a predetermined format, constructing for all of the components, a tree of all the configuration files in the predetermined format, and recording said tree in a location specified by the user.

10. The process for configuring preconfigured software according to claim 9, wherein the fifth subprocess for scanning the configuration of a configured station implemented by the editor of a work station further enables editing, in said work station, of the configuration of any configured, analyzed station by inserting the configuration of the analyzed station into an edited configuration in the work station, a control interface being the graphical user interface of the editor, and further using functionalities of the editor and of the designer for access to the data knowledge base and the data from the user related to the desired configuration, the input data being data in the knowledge base recorded in the work station, the interface which allows access to this base being the knowledge interface, the configuration files generated by the subprocess for analyzing and controlling the configuration in the configured station, which are read using the interface for reading the configuration files, and the data structures which specify the edited configuration into which the configuration of the analyzed station is inserted, and further wherein the output data supplied by the scanning subprocess specifies the edited configuration into which the configuration of the analyzed station has been added, and the input and output data are used during a first operation for reading the configuration data to verify that the configuration is suitable for the knowledge base, then for filling in the internal data structures with the contents of the configuration files, the input data being the data of the knowledge base and the configuration files accessed through the interface for reading the configuration files, during a second operation for connecting to the network represented, examining the edited configuration as well as the configuration data of the analyzed station and determining the links which allow the analyzed station to be connected to the other stations present in the edited configuration, the input data being the data structures representing the edited configuration and the data structures representing the configuration data of the analyzed station, which connection operation modifies the data structures representing the edited configuration when the links are completed, and during a third display operation, designing the new topology after inserting the analyzed station including, the graphical representation of the analyzed station, the graphical representation of the links which allow the analyzed station to be connected to the network, and the representation of the configuration data of the analyzed station in the information pages, the input data being the data structures representing the edited configuration, modified by said operation for connecting.

* * * * *